US007836686B2

(12) United States Patent
Yokoyama et al.

(10) Patent No.: US 7,836,686 B2
(45) Date of Patent: Nov. 23, 2010

(54) EXHAUST GAS PURIFYING SYSTEM FOR INTERNAL COMBUSTION ENGINE

(75) Inventors: Masakuni Yokoyama, Tokai (JP); Jun Kawamura, Chita-gun (JP)

(73) Assignee: Denso Corporation, Kariya (JP)

( * ) Notice: Subject to any disclaimer, the term of this patent is extended or adjusted under 35 U.S.C. 154(b) by 1005 days.

(21) Appl. No.: 11/643,978

(22) Filed: Dec. 22, 2006

(65) Prior Publication Data

US 2007/0144144 A1    Jun. 28, 2007

(30) Foreign Application Priority Data

Dec. 26, 2005 (JP) .............................. 2005-372159

(51) Int. Cl.
*F01N 3/00* (2006.01)
(52) U.S. Cl. .............................. 60/295; 60/286; 60/299; 60/301
(58) Field of Classification Search .................. 60/273, 60/276, 285, 286, 295, 299, 301
See application file for complete search history.

(56) References Cited

U.S. PATENT DOCUMENTS 5,483,795 A    1/1996    Katoh et al.

2001/0032456 A1 *  10/2001   Yonekura et al. .............. 60/277

FOREIGN PATENT DOCUMENTS

| DE | 199 15 793 | 10/2000 |
| JP | 11-343833 | * 12/1999 |
| JP | 2005-113921 | 4/2005 |

OTHER PUBLICATIONS

Japanese Office Action dated Apr. 27, 2010, issued in corresponding Japanese Application No. 2005-372159, with English translation.
German Office Action dated Oct. 21, 2009, issued in corresponding German Application No. 10 2006 035 311.0-13, with English translation.

* cited by examiner

*Primary Examiner*—Thomas E Denion
*Assistant Examiner*—Jesse Bogue
(74) *Attorney, Agent, or Firm*—Nixon & Vanderhye PC

(57) ABSTRACT

An ECU controls a rich purge in the internal combustion engine by temporarily changing an air/fuel ratio of the exhaust gas into a rich range to deoxidize and remove absorbed NOx, which is absorbed by an NOx storage and reduction catalyst of an NOx catalytic converter. The ECU changes a degree of richness of the air/fuel ratio at a time of performing the rich purge based on a state of the NOx catalytic converter.

6 Claims, 5 Drawing Sheets

AMOUNT OF ABSORBED NOx

EXHAUST GAS FLOW QUANTITY

EXHAUST GAS PURIFYING SYSTEM FOR INTERNAL COMBUSTION ENGINE

CROSS REFERENCE TO RELATED APPLICATION

This application is based on and incorporates herein by reference Japanese Patent Application No. 2005-372159 filed on Dec. 26, 2005.

BACKGROUND OF THE INVENTION

1. Field of the Invention

The present invention relates to an exhaust gas purifying system for an internal combustion engine.

2. Description of Related Art

In an internal combustion engine, such as a diesel engine, when lean burn combustion takes place, NOx (nitrogen oxide) is exhausted into the air. It has been proposed to provide an NOx storage and reduction (deoxidization) catalytic converter (hereinafter referred to as "NOx catalytic converter"), which includes an NOx storage and reduction (deoxidization) catalyst, in an exhaust system of a vehicle to purify NOx contained in the exhaust gas. The NOx catalytic converter absorbs NOx contained in the exhaust gas when an air/fuel ratio of the exhaust gas is in a lean range. The NOx catalytic converter deoxidizes (reduces) and removes its absorbed NOx with aid of NOx deoxidizing agent (reducing agent), such as HC and CO, when the air/fuel ratio of the exhaust gas is in a rich range.

When the amount of the absorbed NOx in the NOx catalytic converter reaches a saturation range and thereby reaches its absorbable limit, the NOx purifying performance of the NOx catalytic converter decreases. Thus, an NOx deoxidization control operation for deoxidizing and removing the absorbed NOx of the NOx catalytic converter is performed to limit the decrease of the NOx purifying performance of the NOx catalytic converter. Specifically, rich combustion is temporarily performed in the internal combustion engine, so that the deoxidizing agent, such as HC and CO, contained in the exhaust gas produced at the time of the rich combustion is supplied to the NOx catalytic converter to deoxidize and remove the absorbed NOx at the NOx catalytic converter. This technique is generally referred to as "rich purge" or "rich spike".

When the internal combustion engine is used for a long period of time, sulfur components contained in the fuel are absorbed and accumulated by the NOx catalytic converter. This phenomenon is called as "sulfur poisoning". The sulfur poisoning significantly decreases the purifying performance of the NOx catalytic converter. According to one technique, a purifying performance of the NOx catalytic converter is determined based on a measurement of an air/fuel ratio (A/F) sensor, which is provided on a downstream side of the NOx catalytic converter. Then, a rich purge is performed in a manner that corresponds to the determined purifying performance of the NOx catalytic converter (see, for example, Japanese Patent No. 2692380, which corresponds to U.S. Pat. No. 5,483,795). Specifically, at the time of performing the rich purge, when the deoxidization of the absorbed NOx is completed in the NOx catalytic converter, the air/fuel ratio on the downstream side of the NOx catalytic converter is shifted into the rich range, and this shift is sensed with the A/F sensor to determine the completion of the NOx deoxidization in the NOx catalytic converter. In this case, when the NOx purifying performance of the NOx catalytic converter decreases, i.e., when the absorbable amount of the NOx decreases, the timing of shifting in the air/fuel ratio into the rich range is advanced. Thus, the required time period, which is required to deoxidize the absorbed NOx, is shortened. Therefore, it is possible to determine the decrease in the purifying performance (catalyst deterioration) of the NOx catalytic converter based on the required time period, which is required to deoxidize the absorbed NOx.

However, the A/F sensor has a response time lag, so that the measured change timing of the air/fuel ratio, which is measured based on the measurement of the A/F sensor, is delayed from the actual change timing of the air/fuel ratio. Because of this response time lag, it is assumed that the computed required time period, which is required to deoxidize the NOx, contains an error. At this time, as the required time period gets shorter, the error constitutes a larger part of the required time period. That is, in the case where the purifying performance of the NOx catalytic converter is decreased, the accuracy in the determination of the purifying performance of the NOx catalytic converter may possibly be deteriorated.

SUMMARY OF THE INVENTION

The present invention addresses the above disadvantage. Thus, it is an objective of the present invention to provide an exhaust gas purifying system for an internal combustion engine capable of effectively limiting occurrence of an erroneous determination of a purifying performance of a catalytic converter provided in the exhaust gas purifying system.

To achieve the objective of the present invention, there is provided an exhaust gas purifying system for an internal combustion engine. The exhaust gas purifying system includes an NOx catalytic converter, at least one oxygen concentration sensor, a rich purge control means and a purifying performance determining means. The NOx catalytic converter includes an NOx storage and reduction catalyst and is provided in an exhaust system of the internal combustion engine. The at least one oxygen concentration sensor measures an oxygen concentration in exhaust gas in the exhaust system, and at least one of the at least one oxygen concentration sensor is provided on a downstream side of the NOx catalytic converter. A rich purge control means is for performing and controlling a rich purge in the internal combustion engine. The rich purge control means controls the rich purge by temporarily changing an air/fuel ratio of the exhaust gas into a rich range to deoxidize and remove absorbed NOx, which is absorbed by the NOx storage and reduction catalyst, and the rich purge control means changes a degree of richness of the air/fuel ratio at a time of performing the rich purge based on a state of the NOx catalytic converter. The purifying performance determining means is for determining a purifying performance of the NOx catalytic converter based on a required deoxidization time period, which is required to deoxidize the absorbed NOx and is computed based on a measurement of the at least one oxygen concentration sensor at a time of performing the rich purge.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. In the following embodiment, the present invention is implemented in a vehicle having a diesel engine (an internal combustion engine), which serves as a drive source of the vehicle. In the following description, an engine system of the vehicle will be schematically described.

Figure 1:
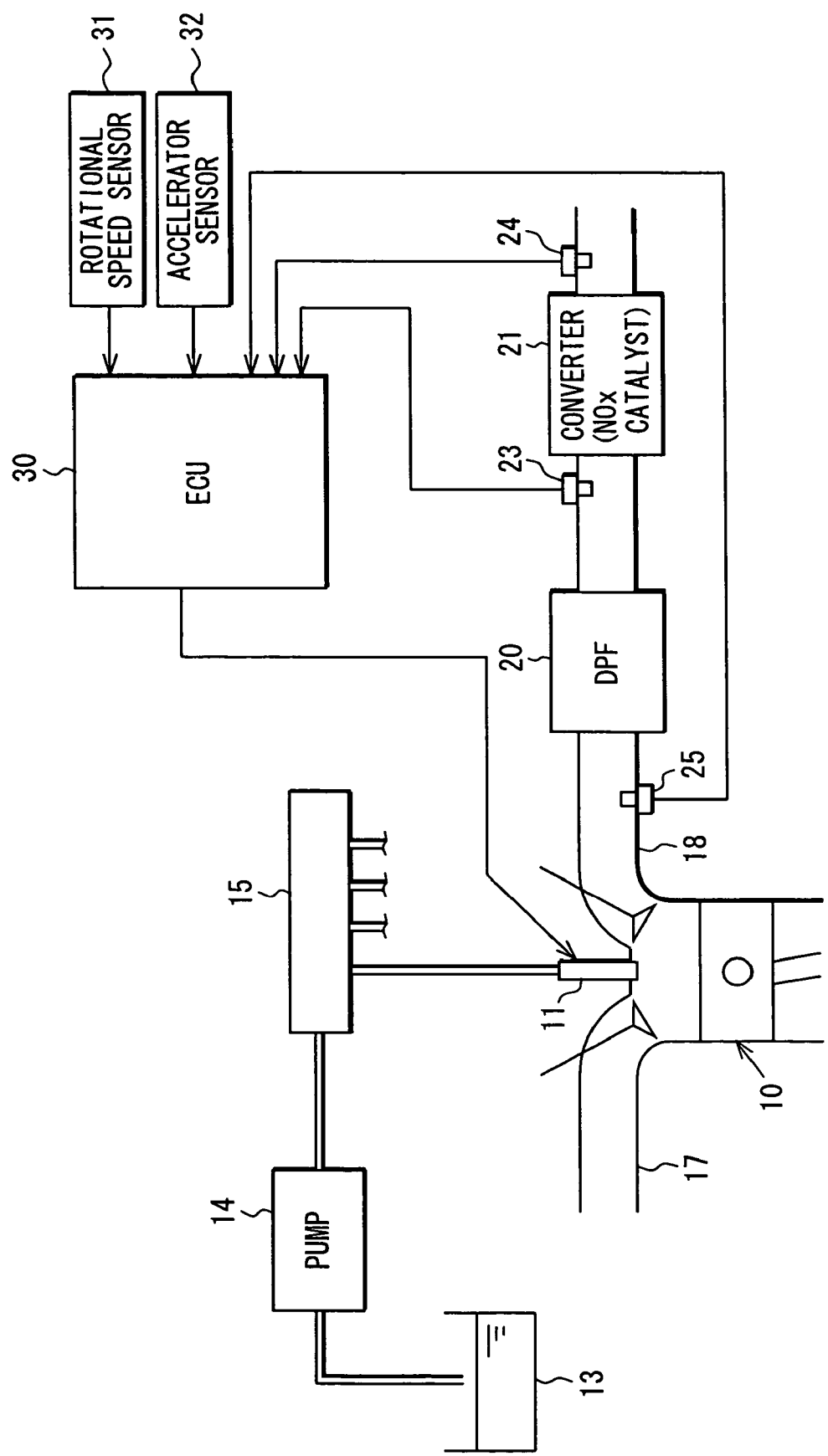
FIG. 1 is a diagram schematically showing a structure of an engine system according to an embodiment of the present invention.

In FIG. 1, solenoid type injectors 11 (only one is depicted in FIG. 1) are provided to cylinders, respectively, of the engine 10. Fuel is injected from the injectors 11 according to a predetermined combustion sequence. A common rail type fuel supply system is used in a fuel supply system of the present engine system. A high pressure pump 14 takes fuel from a fuel tank 13 and pumps the fuel to a common rail 15. The fuel in the common rail 15 is kept in the high pressure state through the pumping of the fuel from the high pressure pump 14. The high pressure fuel in the common rail 15 is supplied to each injector 11, and the fuel is injected into the corresponding cylinder of the engine through valve opening of the injector 11. Furthermore, an air intake pipe 17 and an exhaust pipe 18 are connected to the engine 10. Air is supplied to each cylinder of the engine 10 through the air intake pipe 17, and the exhaust gas is outputted from each cylinder through the exhaust pipe (exhaust system) 18 upon combustion of the fuel in the cylinder.

A diesel particulate filter (DPF) 20 and an NOx storage and reduction catalytic converter (hereinafter referred to as NOx catalytic converter) 21 are provided in the exhaust pipe 18 to form a post combustion processing system to purify the exhaust gas. Specifically, the DPF 20 collects particulate matter (PM) contained in the exhaust gas, and the NOx catalytic converter 21 includes an NOx storage and reduction catalyst (NSRC) to purify NOx contained in the exhaust gas. According to the present embodiment, the DPF 20 is provided at an upstream part of the exhaust pipe 18, and the NOx catalytic converter 21 is provided at a downstream part of the exhaust pipe 18. Here, it should be noted that the position of the DPF 20 and the position of the NOx catalytic converter 21 may be reversed such that the DPF 20 is provided at the downstream part of the exhaust pipe 18, and the NOx catalytic converter 21 is provided at the upstream part of the exhaust pipe 18. The DPF 20 and the NOx catalytic converter 21 may be integrated into a single purifying device, which is provide in the exhaust pipe 18. Furthermore, an oxidation catalytic converter may be provided on the downstream side of the NOx catalytic converter.

As is well known in the art, at the time of lean burn combustion, the catalyst in the NOx catalytic converter 21 absorbs NOx contained in the exhaust gas. Then, at the time of rich burn combustion, the absorbed NOx is deoxidized and removed at the catalyst of the NOx catalytic converter 21 by using HC and CO contained in the exhaust gas.

An A/F sensor 23 is provided on an upstream side of the NOx catalytic converter 21, and an A/F sensor 24 is provided on a downstream side of the NOx catalytic converter 21. Each A/F sensor 23, 24 is formed as an oxygen concentration sensor, which outputs an oxygen concentration measurement signal that corresponds to an oxygen concentration in the exhaust gas. An air/fuel ratio is computed based on the oxygen concentration measurement signal. In place of each A/F sensor 23, 24, it is possible to provide an oxygen ($O_2$) sensor, which outputs a corresponding electromotive force based on whether the exhaust gas is rich or lean. In addition, an exhaust temperature sensor 25 is provided on the upstream side (or on the downstream side) of the DPF 20 in the exhaust pipe 18 to sense the temperature of the exhaust gas.

An ECU 30 is an electronic control unit, which includes a known microcomputer that has a CPU, a ROM, a RAM, an EEPROM and the like. Measurement signals are supplied to the ECU 30 from various sensors, such as the A/F sensors 23, 24, the exhaust temperature sensor 25, a rotational speed sensor 31 and an accelerator sensor 32. The rotational speed sensor 31 senses a rotational speed of the engine, and the accelerator sensor 32 senses an operational amount of an accelerator by a driver. The ECU 30 executes various control programs, which are stored in the ROM, to perform, for example, a fuel injection operation of each injector 11 according to an engine operational state. That is, the ECU 30 determines the best fuel injection quantity and fuel injection timing based on the engine operational information, which includes the engine rotational speed and the accelerator operational amount. Then, the ECU 30 drives each injector 11 based on an injection control signal, which corresponds to the thus determined best fuel injection quantity and fuel injection timing.

In the case of the common rail type fuel supply system, a fuel pressure feedback control operation of the high pressure pump 14 is performed such that the fuel pressure in the common rail 15 coincides with a target value. However, such a fuel pressure feedback control operation does not constitute a main part of the present invention and therefore will not be described in detail.

Furthermore, whenever a predetermined condition is satisfied, the ECU 30 performs an NOx deoxidization control operation for deoxidizing and removing the absorbed NOx at the NOx catalytic converter 21 to recover the NOx absorbing performance of the NOx catalytic converter 21. In the present embodiment, a rich purge control operation is performed to temporarily shift the air/fuel ratio from the lean range into the rich range through a rich purge. In this way, deoxidizing agent, such as HC, CO, is supplied to the NOx catalytic converter 21, and thereby the NOx, which is absorbed by the NOx catalytic converter 21, is deoxidized and removed at the NOx catalytic converter 21 by the deoxidizing agent. At this time, the absorbed NOx is converted to nitrogen ($N_2$), carbon dioxide ($CO_2$) and water ($H_2O$) and is thereby removed from the NOx catalytic converter 21. Through the removal of NOx, the NOx purifying performance of the NOx catalytic converter 21 is recovered.

Furthermore, at the time of performing the NOx deoxidization control operation, the ECU 30 performs a purifying performance determining operation for determining whether the purifying performance of the NOx catalytic converter 21 is decreased due to sulfur poisoning and/or the catalyst deterioration. The purifying performance determining operation is performed based on the measurement signals of the A/F sensors 23, 24, which are provided on the upstream side and the downstream side, respectively, of the NOx catalytic converter 21. The NOx absorbing performance of the NOx catalytic converter 21 is decreased when sulfur oxide (SOx) adheres to the NOx catalytic converter 21 (more specifically to the catalyst of the NOx catalytic converter 21).

When the purifying performance of the NOx catalytic converter 21 is decreased, the amount of the absorbable NOx, which is absorbable by the NOx catalytic converter 21, is decreased. Thus, a time period (hereinafter, referred to as a required deoxidization time period), which is required to deoxidize the absorbed NOx of the NOx catalytic converter 21 to a satisfactory level, is shortened. The purifying performance of the NOx catalytic converter 21 is determined based on this phenomenon. Specifically, the required deoxidization time period is computed based on the measurements of the A/F sensors 23, 24, and a decrease in the purifying performance of the NOx catalytic converter (a degree of sulfur poisoning or a degree of catalyst deterioration in the NOx catalytic converter 21) is determined based on the required deoxidization time period. Specifically, at the time of performing the rich purge, the ECU 30 senses the start timing, at which the supplying of the deoxidizing agent (rich agent) to the NOx catalytic converter 21 starts, based on the measurement signal of the upstream side A/F sensor 23, and the ECU 30 also senses the end timing, at which the deoxidization and removal of the absorbed NOx at the NOx catalytic converter 21 is completed, based on the measurement signal of the downstream side A/F sensor 24. Then, the ECU 30 determines the decrease in the purifying performance of the NOx catalytic converter 21 based on a required time period between the start timing and the end timing.

The A/F sensors 23, 24, which output the oxygen concentration measurement signals, have a response time lag. Thus, at the time of performing the rich purge, when the decrease in the purifying performance of the NOx catalytic converter 21 is determined, an error occurs in the computed required deoxidization time period due to the response time lags of the A/F sensors 23, 24. When the required deoxidization time period is relatively long, the response time lags of the A/F sensors 23, 24 may not cause a substantial trouble in terms of the accuracy in the determination of the purifying performance of the NOx catalytic converter 21. However, when the required deoxidization time period is shortened due to the decrease in the purifying performance of the NOx catalytic converter 21, the above error may cause a trouble in terms of the accuracy in the determination of the purifying performance of the NOx catalytic converter 21. Thus, the accuracy in the determination of the purifying performance of the NOx catalytic converter may possibly be decreased.

In view of the above point, according to the present embodiment, at the time of performing the rich purge, a degree of richness in the air/fuel ratio is changed according to a state of the NOx catalytic converter 21. In this way, the required deoxidization time period can be increased within a permissible range, at which the response time lags of the A/F sensors 23, 24 will not cause an excess influence on the determination of the purifying performance of the NOx catalytic converter 21. Therefore, the required deoxidization time period can be appropriately computed. As a result, the decrease in the accuracy in the determination of the purifying performance of the NOx catalytic converter 21 can be limited.

Figure 2:
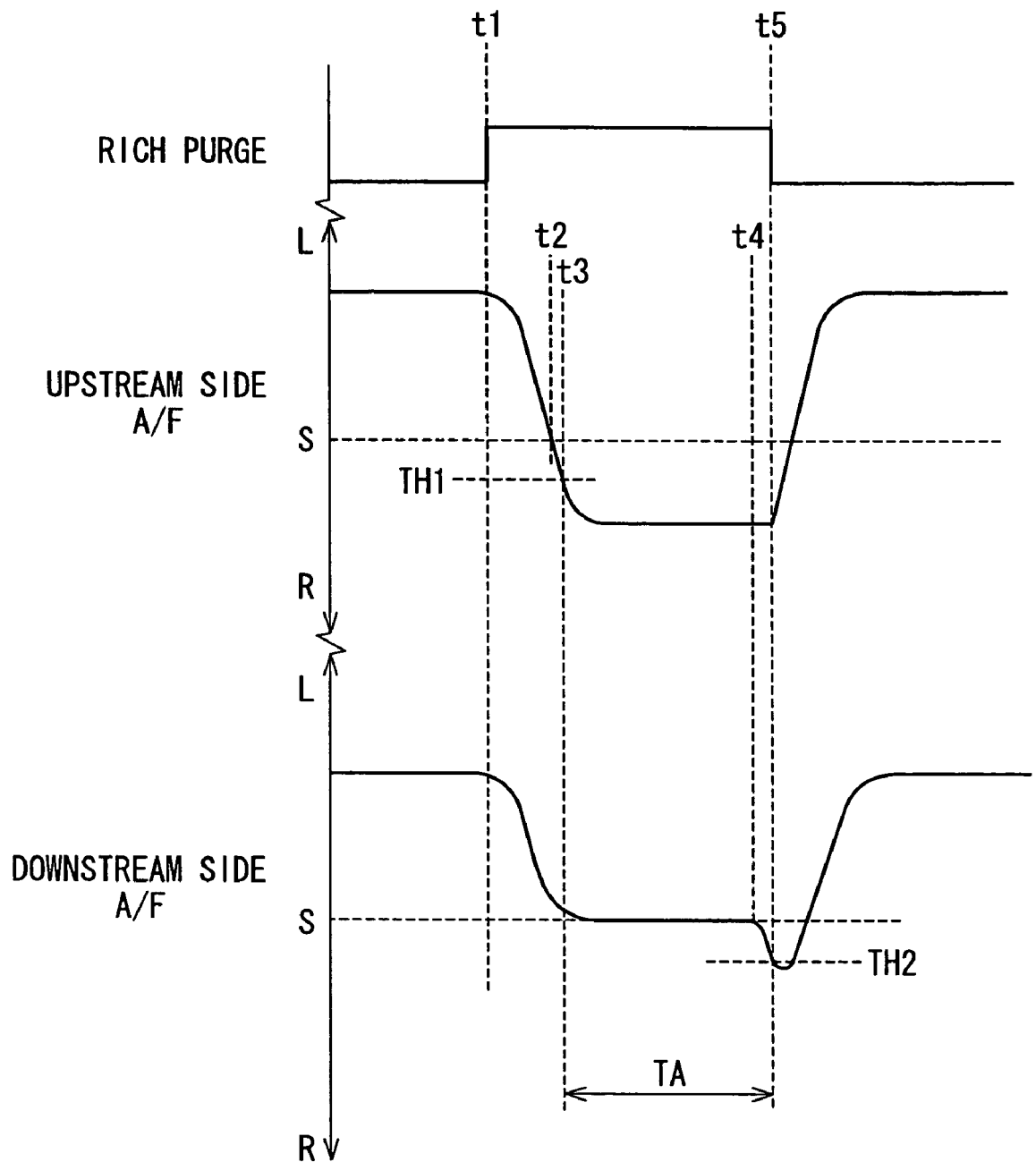
FIG. 2 is a time chart schematically showing a rich purge control operation and a purifying performance determining operation for determining a purifying performance of an NOx catalytic converter according to the embodiment.

Next, the rich purge and the purifying performance determining operation, which are performed at the same time, will be described with reference to the time chart shown in FIG. 2. In FIG. 2, a top graph part indicates an on and off of a rich purge with reference to time. Also, an intermediate graph part indicates the measurement result of the upstream side A/F sensor 23, which is provided on the upstream side of the NOx catalytic converter 21, with reference to time, and a bottom graph part indicates the measurement result of the downstream side A/F sensor 24, which is provided on the downstream side of the NOx catalytic converter 21, with reference to time. Furthermore, in the middle and bottom graph parts of FIG. 2, "L" denotes "lean", and "R" denotes "rich", and "S" denotes a stoichiometric air/fuel ratio.

In FIG. 2, at the timing t1, a predetermined execution condition for initiating the rich purge is satisfied, so that the rich purge is started, and the fuel injection quantity of the injector 11 is increased. Thereby, the upstream side air/fuel ratio, which is measured with the A/F sensor 23, begins to shift from the lean range toward the rich range. At the timing t2 where the air/fuel ratio reaches a stoichiometric air/fuel ratio, the deoxidization of the absorbed NOx begins. Here, a predetermined rich side threshold value TH1 is set to determine the start of the NOx deoxidization. At the timing t3, the upstream side air/fuel ratio reaches the threshold value TH1. Thus, it is determined that the NOx deoxidization is started. Here, a time difference between the timing t1, at which the rich purge is started, and the timing t3, at which the NOx deoxidization is started, is caused by, for example, a time lag in the conduction of the exhaust gas flow in the exhaust pipe and/or a response time lag of the A/F sensor 23.

After the timing t3, the deoxidizing agent in the exhaust gas reacts with the absorbed NOx in the NOx catalytic converter 21, so that the deoxidization of the NOx begins in the NOx catalytic converter 21. In the NOx catalytic converter 21, the supplied deoxidizing agent is substantially entirely consumed, so that the downstream side air/fuel ratio is held generally in the stoichiometric air/fuel ratio (theoretical air/fuel ratio).

Then, when the deoxidization of the absorbed NOx in the NOx catalytic converter 21 is completed, the supplied deoxidizing agent does not react in the NOx catalytic converter 21 any longer and is thereby outputted from the NOx catalytic converter 21 on the downstream side thereof. Therefore, at the timing t4, at which the NOx deoxidization is completed, the downstream side air/fuel ratio, which is measured with the downstream side A/F sensor 24, begins to shift into the rich range. Then, at the timing t5, the downstream side air/fuel ratio reaches a rich side threshold value TH2, so that it is determined that the NOx deoxidization is completed. The timing t5 is the end timing of the rich purge. Therefore, the fuel injection quantity control operation is returned to the normal control operation after the timing t5.

Due to the response time lag of the A/F sensors 23, 24, the timing of changing the upstream side air/fuel ratio, which is determined based on the measurement of the A/F sensor 23, and the timing of changing the downstream side air/fuel ratio, which is determined based on the measurement of the A/F sensor 24, are deviated from the actual timing of changing the upstream side air/fuel ratio and the actual timing of changing the downstream side air/fuel ratio, respectively. Thus, such a delay in the timing is included in the required deoxidization time period TA, as an error caused by the response time lag. Furthermore, the response of the sensors varies from one sensor to another sensor, so that the response time lag is not uniform among the sensors.

Figure 3:
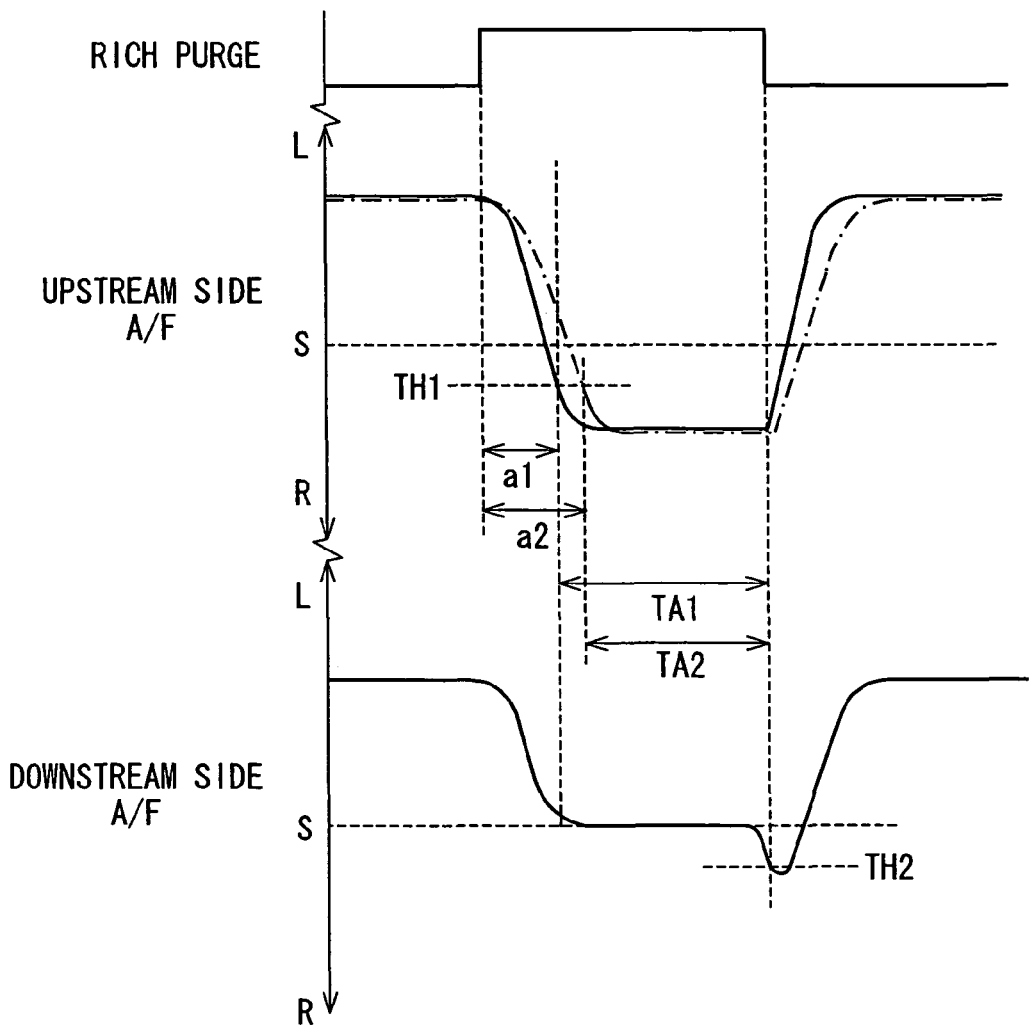
FIG. 3 is a time chart showing response time lag differences among A/F sensors.

FIG. 3 is a diagram for describing the variations in the response time lag in the A/F sensors 23, 24. In FIG. 3, a top graph part indicates an on and off of a rich purge with reference to time. Also, an intermediate graph part indicates the measurement result of the upstream side A/F sensor 23, which is provided on the upstream side of the NOx catalytic converter 21, with reference to time, and a bottom graph part indicates the measurement result of the downstream side A/F sensor 24, which is provided on the downstream side of the NOx catalytic converter 21, with reference to time. Furthermore, in the middle and bottom graph parts of FIG. 2, "L" denotes "lean", and "R" denotes "rich", and "S" denotes a stoichiometric air/fuel ratio. Here, for the descriptive purpose, two sensors (i.e., a faster response sensor and a slower response sensor), which show different responses, will be described as the upstream side A/F sensor 23. Furthermore, a single sensor will be described as the downstream side A/F sensor 24.

In the case of the faster response sensor, which is implemented as the upstream side A/F sensor 23, the response time lag period, which is measured between the time of starting of the rich purge and the time of reaching of the upstream side air/fuel ratio to the threshold value TH1, is indicated by "a1" in FIG. 3. In the case of the slower response sensor, which is implemented as the other upstream side A/F sensor 23, the response time lag period, which is measured between the time of starting of the rich purge and the time of reaching of the upstream side air/fuel ratio to the threshold value TH1, is indicated by "a2" in FIG. 3. A difference in the response time lag periods a1, a2 corresponds to a difference in the response time lags of the A/F sensors, and the response time lag periods a1, a2 have the relationship of a1<a2.

In the case of the faster response sensor, the required deoxidization time period TA, which is measured between the time of reaching of the upstream side air/fuel ratio to the threshold value TH1 and the time of reaching of the downstream side air/fuel ratio to the threshold value TH2, is indicated by TA1. In the case of the slower response sensor, the required deoxidization time period TA, which is measured between the time of reaching of the upstream side air/fuel ratio to the threshold value TH1 and the time of reaching of the downstream side air/fuel ratio to the threshold value TH2, is indicated by TA2. Here, the ratio of the response time lag period a2 with respect to the required deoxidization time period TA2 is larger than the ratio of the response time lag period a1 with respect to the required deoxidization time period TA1. Specifically, the ratio of the error, which is included in the required deoxidization time period TA2 measured with the slower response sensor, is larger than the ratio of the error, which is included in the required deoxidization time period TA1 measured with the faster response sensor. Furthermore, the ratio of the error, which is included in the required deoxidization time period TA, increases or decreases depending on the length of the required deoxidization time period TA.

Figure 4:
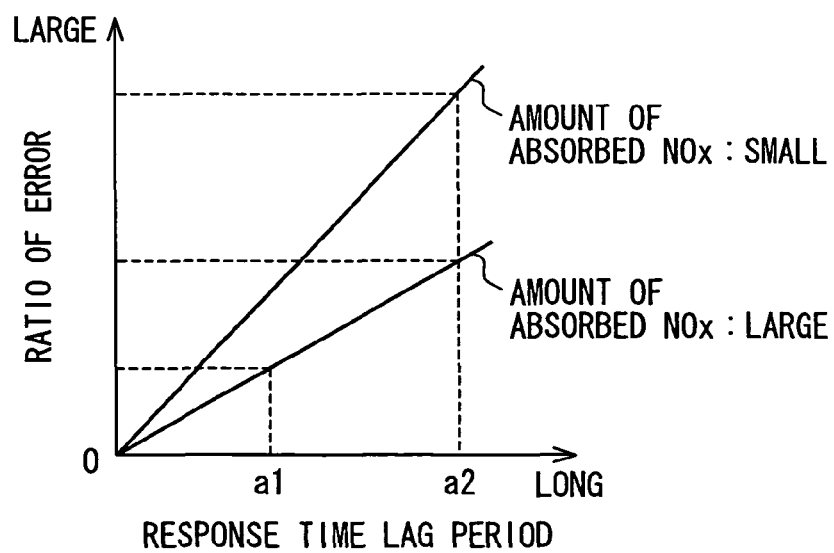
FIG. 4 is a diagram showing characteristics of an error contained in a required deoxidization time period, which is required to deoxidize absorbed NOx at the catalytic converter.

FIG. 4 shows the characteristics of the error included in the required deoxidization time period TA. According to FIG. 4, the case of the smaller amount (small amount) of the absorbed NOx shows the larger ratio of the error in the required deoxidization time period TA in comparison to the case of the larger amount (large amount) of the absorbed NOx. Here, in the case of the larger amount of the absorbed NOx, the required deoxidization time period TA becomes longer. In the case of the smaller amount of the absorbed NOx, the required deoxidization time period TA becomes shorter. Thus, when the required deoxidization time period TA is relatively long, the ratio of the error in the required deoxidization time period TA becomes smaller. In contrast, when the required deoxidization time period TA is relatively short, the ratio of the error in the required deoxidization time period TA becomes longer. In the case of the response time lag period a1, the ratio of the error in the required deoxidization time period TA becomes relatively small. In the case of the response time lag period a2, the ratio of the error in the required deoxidization time period TA becomes relatively large.

In the above description made with reference to FIGS. 3 and 4, the characteristics of the response time lag of the upstream side A/F sensor 23 are described. However, it should be noted that the characteristics of the response time lag of the downstream side A/F sensor 24 will be similar to those of the upstream side A/F sensor 23.

As described above, when the required deoxidization time period TA is relatively short, the ratio of the error in the required deoxidization time period TA becomes larger in comparison to the case where the required deoxidization time period TA is relatively long. That is, in the state where the amount of the absorbed NOx is decreased in the NOx catalytic converter 21, the required deoxidization time period TA becomes shorter, and thereby the accuracy in the determination of the purifying performance of the NOx catalytic converter is decreased. In view of the above point, the required deoxidization time period TA is adjusted according to the state of the NOx catalytic converter 21. Specifically, the amount of the absorbed NOx in the NOx catalytic converter 21 is used as a parameter, which indicates the state of the NOx catalytic converter 21. When the amount of the absorbed NOx becomes smaller, the degree of richness in the air/fuel ratio at the time of performing the rich purge is decreased to increase the required deoxidization time period TA.

Figure 5:
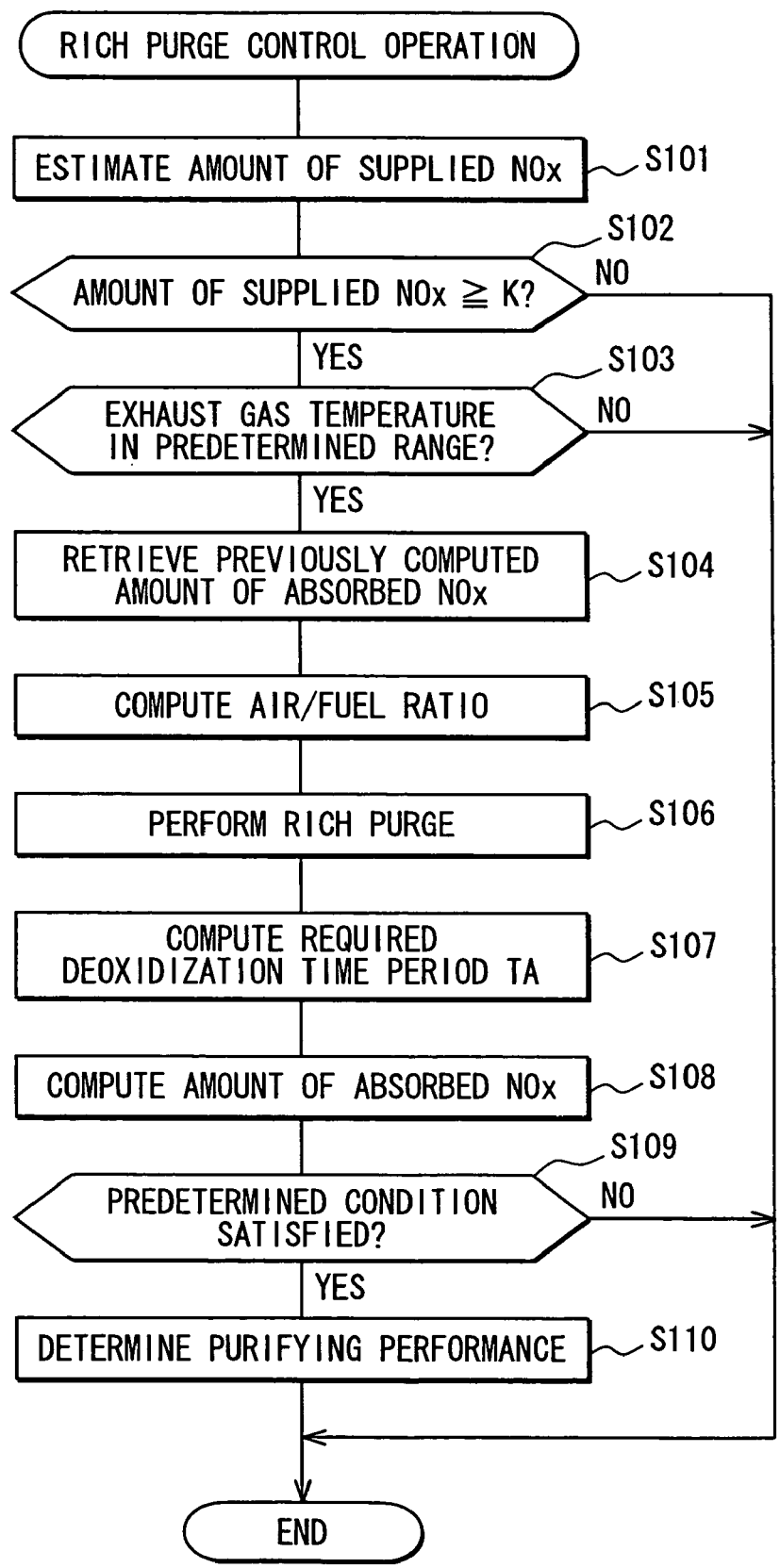
FIG. 5 is a flowchart showing a rich purge control operation.

The procedure of the purifying performance determining operation executed by the ECU 30 for determining the purifying performance of the NOx catalytic converter 21 at the time of performing the rich purge will be described. FIG. 5 shows a flowchart that indicates the procedure of the rich purge control operation, which is repeated at predetermined time intervals.

With reference to FIG. 5, at step S101, the amount of the supplied NOx, which is supplied to the NOx catalytic converter 21 through the exhaust pipe 18, is estimated. At this time, the amount of the supplied NOx can be estimated based on the engine operational state (operational mode) at each time. For example, the combustion temperature may be computed based on the engine rotational speed and/or the load (e.g., the accelerator operational amount). Then, based on the combustion temperature, the amount of the supplied NOx is computed and is cumulated to estimate the amount (total amount) of the supplied NOx. Alternatively, the NOx concentration in the exhaust gas may be sensed with an NOx sensor, which is provided in the exhaust pipe. Then, the amount of the supplied NOx may be computed based on the sensed NOx concentration.

Then, at step S102, it is determined whether the estimated amount of the supplied NOx, which is estimated at step S101, is equal to or greater than a predetermined threshold value K. When it is determined that the estimated amount of the supplied NOx is less than the predetermined threshold value K at step S102 (i.e., NO at step S102), the ECU 30 determines that the rich purge is not required at this time. Thus, the ECU 30 terminates the current operation.

In contrast, when it is determined that the estimated amount of the supplied NOx is equal to or larger than the predetermined threshold value K at step S102 (i.e., YES at step S102), the ECU 30 proceeds to step S103. At step S103, the exhaust gas temperature is measured based on the measurement signal of the exhaust temperature sensor 25, and it is determined whether the measured exhaust gas temperature is within a predetermined temperature range (min to max). In the present instance, the above temperature range is the temperature condition, which needs to be satisfied to properly perform the NOx deoxidization in the NOx catalytic converter 21. The above lower limit value "min" is the minimum required temperature, which is required to perform the deoxidization reaction in the NOx catalytic converter 21. For example, the lower limit value "min" may be set to 300 degrees Celsius. The above upper limit value "max" is the temperature, at which the absorbed NOx is released from the NOx catalytic converter 21 regardless of the supply of the deoxidizing agent. For example, the upper limit value "max" may be set to 450 degrees Celsius.

When it is determined that the exhaust gas temperature is not within the predetermined temperature range at step S103 (i.e., NO at step S103), the current operation is terminated. In contrast, when it is determined that the exhaust gas temperature is within the predetermined temperature range at step S103 (i.e., YES at step S103), the ECU 30 proceeds to step S104.

At step S104, a previously computed amount of the absorbed NOx, which is computed in the previous execution of the rich purge, is retrieved. As will be described below, the amount of the absorbed NOx is computed every time the rich purge is executed. Thus, at this stage, the previous amount of the absorbed NOx, which is computed in the previous execution of the rich purge, is retrieved. Then, at step S105, the degree of richness of the air/fuel ratio is computed. The degree of richness of the air/fuel ratio is computed based on the relationship between the amount of the absorbed NOx and the air/fuel ratio shown in FIG. 6.

Figure 6:
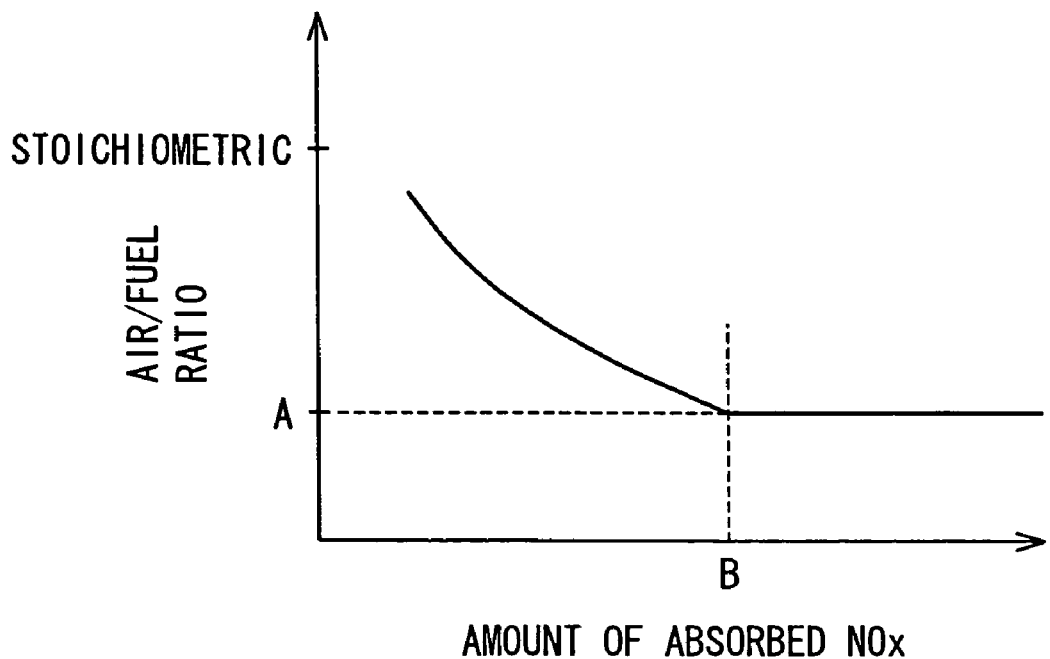
FIG. 6 is a diagram showing a relationship between an amount of the absorbed NOx and an air/fuel ratio.

According to FIG. 6, when the amount of the absorbed NOx is equal to or less than a predetermined value B, the degree of richness of the air/fuel ratio decreases in response to the decrease in the amount of the absorbed NOx. When the amount of the absorbed NOx is larger than the predetermined value B, the air/fuel ratio is fixed to a predetermined value A regardless of the amount of the absorbed NOx. For example, the predetermined value A may be set to 12.0, which is a typical air/fuel ratio observed at the time of performing the normal rich purge.

When the amount of the absorbed NOx becomes relatively small, the required deoxidization time period TA becomes relatively short. When the required deoxidization time period TA becomes relatively short, the ratio of the error relative to the required deoxidization time period TA becomes relatively large. Thus, when the amount of the absorbed NOx is smaller than the predetermined value B, the degree of richness of the air/fuel ratio becomes relatively small to ensure the appropriateness of the required deoxidization time period. When the amount of the absorbed NOx is larger than the predetermined value B, i.e., when the amount of the absorbed NOx is sufficiently large, the degree of richness of the air/fuel ratio is fixed due to the following reason. That is, when the degree of richness of the air/fuel ratio becomes relatively small, the required deoxidization time period may become unnecessarily lengthened.

Returning to FIG. 5, at step S106, the rich purge is performed at the computed degree of richness of the air/fuel ratio, which is computed at step S105. Then, at step S107, the required deoxidization time period TA is computed. At this time, as described above with reference to FIG. 2, after the initiation of the rich purge, the start timing of the NOx deoxidization and removal is sensed based on the upstream side air/fuel ratio, and the end timing of the NOx deoxidization and removal is sensed based on the downstream side air/fuel ratio. The rich purge is terminated upon the completion of the NOx deoxidization. Then, the required deoxidization time period TA is computed based on the start timing of the deoxidization and the end timing of the deoxidization.

Then, at step S108, the amount of the absorbed NOx at the NOx catalytic converter 21 is computed. The amount of the absorbed NOx corresponds to a product of the amount of the deoxidized and removed NOx per unit time and the required deoxidization time period TA. Thus, the amount of the absorbed NOx correlates with a product of the degree of richness of the air/fuel ratio and the required deoxidization time period TA. Therefore, the amount of the absorbed NOx is computed based on the measurement of the upstream side A/F sensor 23 and the required deoxidization time period TA.

At step S109, it is determined whether a predetermined execution condition for executing the purifying performance determining operation is satisfied. This execution condition is a condition, in which the decrease in the purifying performance of the NOx catalytic converter 21 is supposed to take place due to the sulfur poisoning and/or the catalyst deterioration. For example, a travel distance of the vehicle may be measured, and the execution condition may be satisfied every time the travel distance of the vehicle reaches a predetermined distance (e.g., 10,000 km). Alternatively, a total fuel injection quantity (a cumulative value of every fuel injection quantity) of the injector 11 may be computed, and the execution condition may be satisfied every time the total fuel injection quantity reaches a predetermined quantity. When it is determined that the predetermined execution condition is not satisfied at step S109 (i.e., NO at step S109), the current operation is terminated without any further action. In contrast, when it is determined that the execution condition is satisfied at step S109 (i.e., YES at step S109), the ECU 30 proceeds to step S110.

At step S110, the decrease of the purifying performance (or the decrease of the purifying performance) of the NOx catalytic converter 21 is determined through use of the required deoxidization time period TA, which is computed at step S107 and is used as the parameter. For example, a threshold time may be preset. Then, the required deoxidization time period TA is compared with the threshold time. When the required deoxidization time period TA is longer than the threshold time, it may be determined that the purifying performance of the NOx catalytic converter 21 is not decreased. In contrast, when the required deoxidization time period TA is shorter than the threshold time, it may be determined that the purifying performance of the NOx catalytic converter 21 is decreased. Here, at the time of performing the rich purge, when the degree of richness of the air/fuel ratio is decreased due to the decrease in the amount of the absorbed NOx at the NOx catalytic converter 21, the threshold time may be set according to the degree of richness of the air/fuel ratio. Furthermore, the purifying performance of the NOx catalytic converter 21 may be determined based on the amount of the absorbed NOx at the NOx catalytic converter 21.

In the case where the purifying performance of the NOx catalytic converter 21 is decreased, a fail determination may be made, or sulfur poisoning regeneration control operation may be performed to recover the purifying performance of the NOx catalytic converter 21. The sulfur poisoning regeneration control operation is performed as follows. That is, when the rich purge is performed continuously for a relatively long period of time, and the high temperature and rich atmosphere is maintained, the absorbed SOx, which is absorbed by the NOx catalytic converter 21, is released. Thus, the purifying performance of the NOx catalytic converter 21 is recovered.

The present embodiment provides the following advantages.

The degree of richness of the air/fuel ratio at the time of performing the rich purge is changed according to the amount of the absorbed NOx at the NOx catalytic converter 21. Thus, the adjustment of the required deoxidization time period TA is made possible. Therefore, the required deoxidization time period TA is adjusted within the permissible range, in which the influence of the response time lag of the A/F sensors 23, 24 is not excessive. Thus, the required deoxidization time period TA, which is the parameter used to determine the purifying performance of the NOx catalytic converter, can be appropriately computed. Therefore, the accuracy in the determination of the purifying performance of the NOx catalytic converter is improved, and the exhaust emission is appropriately controlled.

The degree of richness of the air/fuel ratio decreases when the amount of the absorbed NOx decreases. In this way, the speed of progress of the NOx deoxidization decreases to lengthen the required deoxidization time period. That is, in the case where the purifying performance of the NOx catalytic converter 21 is relatively low, the degree of richness of the air/fuel ratio is decreased, so that the decrease of the required deoxidization time period TA is advantageously limited.

When the amount of the absorbed NOx is equal to or greater than the predetermined value, the degree of richness of the air/fuel ratio is not changed. Thus, the required deoxidization time period TA is not unnecessarily lengthened. In this way, the rich purge can be performed within the appropriate time period.

When the amount of the absorbed NOx, which is obtained in the previous execution of the rich purge, is retrievable or obtainable, the degree of richness of the air/fuel ratio can be changed according to the amount of the absorbed NOx. Therefore, it is possible to perform the rich purge in the manner, which is suitable for the state of the NOx catalytic converter 21.

The present invention is not limited to the above embodiment. For example, the above embodiment may be modified in the following manner.

In the above embodiment, the degree of richness of the air/fuel ratio is changed every time according to the state (the amount of the absorbed NOx) of the NOx catalytic converter 21. Alternatively, the degree of richness of the air/fuel ratio may be changed only when the purifying performance determining operation for determining the NOx catalytic converter 21 is performed at the time of performing the rich purge.

Figure 7:
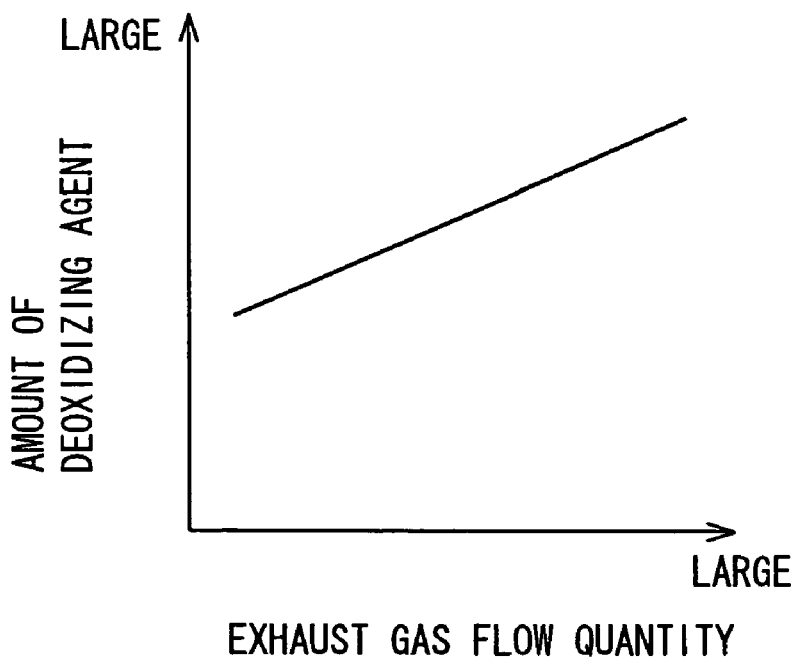
FIG. 7 is a diagram showing a relationship between an exhaust gas flow quantity and an amount of the deoxidizing agent.

In the above embodiment, the degree of richness of the air/fuel ratio used at the time of performing the rich purge is changed through use of the amount of the absorbed NOx of the NOx catalytic converter 21, which serves as the parameter. Alternatively, the following construction may be used. Specifically, an exhaust gas flow quantity, which is a flow quantity of the exhaust gas in the exhaust pipe 18, may be added as additional parameter. Then, the degree of richness of the air/fuel ratio may be changed based on the amount of the absorbed NOx and the exhaust gas flow quantity. The amount of the deoxidizing agent contained in the exhaust gas varies according to the exhaust gas flow quantity besides the degree of richness of the air/fuel ratio. FIG. 7 shows the relationship between the amount of the deoxidizing agent, which is contained in the exhaust gas, and the exhaust gas flow quantity. According to FIG. 7, in the case where the degree of richness of the air/fuel ratio at the time of performing the rich purge is fixed, the amount of the deoxidizing agent increases when the exhaust gas flow quantity increases. Thus, when the exhaust gas flow quantity increases, the amount of the deoxidizing agent, which is contained in the exhaust gas, increases, that is, the amount of the deoxidizing agent, which is supplied to the NOx catalytic converter 21, increases to decrease the required deoxidization time period TA. Therefore, when the exhaust gas flow quantity is added as the additional parameter to change the degree of richness of the air/fuel ratio, the required deoxidization time period TA can be achieved even when the exhaust gas flow quantity increases. As a result, the accuracy in the determination of the purifying performance of the NOx catalytic converter 21 can be maintained.

In the above embodiment, the required deoxidization time period TA is computed based on the start timing and the end timing of the NOx deoxidization, which are sensed based on the measurement of the upstream side A/F sensor 23 and the measurement of the downstream side A/F sensor 24. This may be modified as follows. That is, the required deoxidization time period may be computed without using the measurement of the upstream side A/F sensor 23. That is, the start timing of the NOx deoxidization control operation may be used as a reference time point, and the ECU 30 may compute the required deoxidization time period as a time period from the reference time point to a time point, at which the rich agent (deoxidizing agent) is sensed by the downstream side A/F sensor 24. Then, the ECU 30 may determine the purifying performance of the NOx catalytic converter 21 based on this required deoxidization time period. In such a case, the A/F sensor (oxygen concentration sensor) should be provided at least on the downstream side of the NOx catalytic converter 21.

According to the above embodiment, the degree of richness of the air/fuel ratio at the time of performing the rich purge is changed to limit the decrease of the required deoxidization time period TA. In addition to this, an execution cycle of the rich purge may be delayed. The rich purge is performed every time the predetermined condition is satisfied. When the execution of the rich purge is delayed, the amount of the absorbed NOx at the NOx catalytic converter 21 increases. Thus, even in the case where the purifying performance of the NOx catalytic converter 21 is relatively low, when the execution cycle of the rich purge is delayed, the amount of the absorbed NOx can be increased. Furthermore, when the degree of richness of the air/fuel ratio is changed, the required deoxidization time period TA can be increased. Therefore, the accuracy in the determination of the purifying performance of the NOx catalytic converter 21 can be improved.

In the present embodiment, the degree of richness of the air/fuel ratio is changed based on the amount of the absorbed NOx at the NOx catalytic converter 21. In addition to this, the degree of richness of the air/fuel ratio may be changed based on the state of the NOx catalytic converter 21, which is estimated based on an operational history of the engine. It is possible to obtain a ballpark figure of the purifying performance of the NOx catalytic converter 21 based on the history information with respect to the operational time of the engine and/or the history information with respect to the number of injections performed through the injector 11. The degree of richness of the air/fuel ratio may be changed based on the estimated state of the NOx catalytic converter 21. Furthermore, the state of the NOx catalytic converter 21 is estimated based on the operational history of the engine, so that the state of the NOx catalytic converter 21, which is since the execution of the previous rich purge, can be estimated. Thus, the degree of richness of the air/fuel ratio can be changed according to the state of the NOx catalytic converter, which is closer to the actual state of the NOx catalytic converter.

According to the above embodiment, the diesel engine is used as the drive source of the vehicle. Alternatively, a gasoline engine may be used as the drive source of the vehicle.

What is claimed is:

1. An exhaust gas purifying system for an internal combustion engine, comprising:
   an NOx catalytic converter that includes an NOx storage and reduction catalyst and is provided in an exhaust system of the internal combustion engine;
   at least one oxygen concentration sensor that measures an oxygen concentration in exhaust gas in the exhaust system, wherein at least one of the at least one oxygen concentration sensor is provided on a downstream side of the NOx catalytic converter;
   a rich purge control means for performing and controlling a rich purge in the internal combustion engine, wherein:
      the rich purge control means controls the rich purge by temporarily changing an air/fuel ratio of the exhaust gas into a rich range to deoxidize and remove absorbed NOx, which is absorbed by the NOx storage and reduction catalyst;
      the rich purge control means changes a degree of richness of the air/fuel ratio at a time of performing the rich purge based on a state of the NOx catalytic converter; and
      the rich purge control means uses an amount of the absorbed NOx of the NOx catalytic converter as a parameter that indicates the state of the NOx catalytic converter; and
   a purifying performance determining means for determining a purifying performance of the NOx catalytic converter based on a required deoxidization time period, which is required to deoxidize the absorbed NOx and is computed based on a measurement of the at least one oxygen concentration sensor at a time of performing the rich purge, wherein the rich purge control means sets the degree of richness of the air/fuel ratio in such a manner that the degree of richness of the air/fuel ratio gets smaller when the amount of the absorbed NOx becomes smaller, to increase the required deoxidization time period within a permissible range, at which a response time lag of the at least one oxygen concentration sensor does not cause an excess influence on the determination of the purifying performance of the NOx catalytic converter executed by the purifying performance determining means.

2. The exhaust gas purifying system according to claim 1, wherein the rich purge control means fixes the degree of richness of the air/fuel ratio when the amount the absorbed NOx is equal to or greater than a predetermined value.

3. The exhaust gas purifying system according to claim 1, wherein the rich purge control means changes the degree of richness of the air/fuel ratio in view of a previously computed amount of the absorbed NOx, which is computed at a previous execution of the rich purge.

4. The exhaust gas purifying system according to claim 1, wherein the rich purge control means changes the degree of richness of the air/fuel ratio in view of an exhaust gas flow quantity, which indicates a flow quantity of the exhaust gas in the exhaust system.

5. The exhaust gas purifying system according to claim 1, wherein:
   the rich purge control means performs the rich purge every time a predetermined condition is satisfied; and
   when the purifying performance determining means determines that the purifying performance of the NOx catalytic converter is decreased, the rich purge control means delays an execution cycle of the rich purge.

6. The exhaust gas purifying system according to claim 1, wherein:
   the rich purge control means estimates the state of the NOx catalytic converter based on an operational history of the internal combustion engine; and
   the rich purge control means changes the degree of richness of the air/fuel ratio based on the estimated state of the NOx catalytic converter.

* * * * *